United States Patent
Williams, Jr. et al.

(10) Patent No.: US 9,444,731 B2
(45) Date of Patent: Sep. 13, 2016

(54) METHODS AND SYSTEMS FOR DATA PACKET ROUTING

(71) Applicant: Cisco Technology, Inc., San Jose, CA (US)

(72) Inventors: John J. Williams, Jr., Pleasanton, CA (US); George Azevedo, San Jose, CA (US); David Lipschutz, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 13/901,613

(22) Filed: May 24, 2013

(65) Prior Publication Data
US 2014/0351282 A1 Nov. 27, 2014

(51) Int. Cl.
*H04L 12/753* (2013.01)

(52) U.S. Cl.
CPC .................................... *H04L 45/48* (2013.01)

(58) Field of Classification Search
CPC ............... G06F 17/30961; G06F 17/30625; G06F 17/30327; G06F 17/30442; G06F 17/30
USPC ......................................................... 707/765
See application file for complete search history.

(56) References Cited

U.S. PATENT DOCUMENTS

| | | | |
|---|---|---|---|
| 6,523,021 B1* | 2/2003 | Monberg et al. | |
| 6,795,432 B1* | 9/2004 | Lee | 370/388 |
| 8,571,882 B1* | 10/2013 | Teitelbaum | 705/2 |
| 8,898,204 B1* | 11/2014 | Sathe et al. | 707/812 |
| 2002/0023089 A1* | 2/2002 | Woo | 707/101 |
| 2004/0008634 A1* | 1/2004 | Rangarajan et al. | 370/256 |
| 2004/0100950 A1* | 5/2004 | Basu et al. | 370/389 |
| 2005/0175010 A1 | 8/2005 | Wilson et al. | |
| 2007/0203909 A1* | 8/2007 | Marathe | 707/7 |
| 2008/0021908 A1* | 1/2008 | Trask et al. | 707/100 |
| 2009/0112901 A1* | 4/2009 | Friedman | 707/101 |
| 2012/0047181 A1* | 2/2012 | Baudel | 707/797 |
| 2012/0166446 A1* | 6/2012 | Bowman et al. | 707/743 |

OTHER PUBLICATIONS

Zhuo Huang et al., "Fast Routing Table Lookup Based on Deterministric Multi-hashing," 10 pgs. (date unknown).
Jiří Tobola et al., "Effective Hash-based IPv6 Longest Prefix Match," IEEE, 2011, 4 pgs.

* cited by examiner

*Primary Examiner* — Hosain Alam
*Assistant Examiner* — Saba Ahmed
(74) *Attorney, Agent, or Firm* — Merchant & Gould P.C.

(57) ABSTRACT

Optimizing a bitmap data tree and a corresponding lookup operation in the bit map data tree may be provided. A number of branches for each search node of a data tree may be counted. The data tree may comprise a plurality of search nodes. Then an optimum depth for the plurality of search nodes may be identified based on the number of branches in the data tree. Next, a hash node may be added to replace a search node of the data tree when a number of branches for the search node is greater than the identified optimum depth.

17 Claims, 4 Drawing Sheets

P1=10*
P2=111*
P3=11001*
P4=1*
P5=0*
P6=1000*
P7=100000*
P8=1000000*

METHODS AND SYSTEMS FOR DATA PACKET ROUTING

TECHNICAL FIELD

The present disclosure relates generally to transferring information over a packet network.

BACKGROUND

In packet networks, such as Internet, information is transferred through a network from a source computer to a destination computer using packets called datagrams. The source computer and the destination computer are called as hosts. The network is an interconnection of the hosts and routers. The routers have input ports for receiving incoming packets and output ports for transmitting outgoing packets. The packets include data from the source computer and a destination address. The routers route the packets to a host or to another router based on the destination address and information stored in a routing table.

In the Internet protocol (IP), a route is either an indirect route or a direct route. When a route is an indirect route, the next destination is another router. A routing table entry indicates the next router's IP address and related routing information, such as the network interface connecting to the next router. When a route is a direct route, the next destination is the destination host. In this case, the routing table entry indicates the network interface to which the destination host is connected. Routing information is hierarchical in nature such that a destination address will include the address of the network and any sub-networks that host the destination node. A router often looks at the hierarchical routing information in an IP address to determine a next hop of a packet.

BRIEF DESCRIPTION OF DRAWINGS

The accompanying drawings, which are incorporated in and constitute a part of this disclosure, illustrate various embodiments of the present disclosure. In the drawings.

DETAILED DESCRIPTION

Overview

Figure 1:
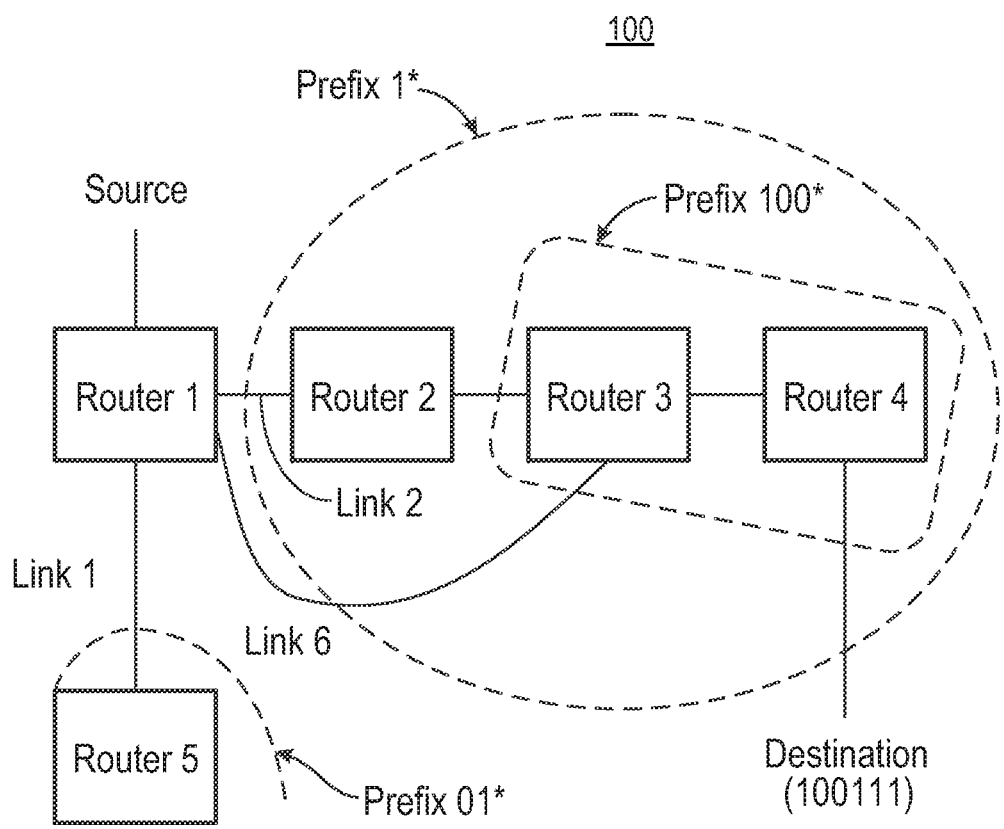
FIG. 1 is a block diagram illustrating data communication using prefixes.

Optimizing a bitmap data tree and a corresponding lookup operation in the bit map data tree may be provided. A number of branches for each search node of a data tree may be counted. The data tree may comprise a plurality of search nodes. Then an optimum depth for the plurality of search nodes may be identified based on the number of branches in the data tree. Next, a hash node may be added to replace a search node of the data tree when a number of branches for the search node is greater than the identified optimum depth.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may be employed by routers in a data communication network for address lookup operations. The methods and systems disclosed herein may be used by the routers to lookup destination addresses and match them to a prefix in order to determine an output data link for routing of a data message. The data messaged may be received by the router from a host device or another router in the network, and may be routed to another router a destination device. To route the messages, the routers may use a forwarding table that may store prefixes for output data links as a data tree. Embodiments of the disclosure may include optimizing the data tree stored on the routers to enhance the lookup operation. The data tree may be optimized by selectively replacing search nodes of the data tree with hash nodes based on a number of branches associated with the search nodes. The data tree may be optimized during formation of the data tree in the routers or during cyclic updates of the data tree during node addition or deletion processes.

FIG. 1 is a block diagram of a data communication network 100. An example of data communication network 100 may include Internet. Data communication network 100 of FIG. 1 may include devices such as routers (Router 1, Router 2, Router 3, Router 4, and Router 5) connected by communication links (shown as lines connecting the routers). The communication links may include links such as fiber optic links, Ethernet links (that can connect more than one router), satellite links, etc. that allow a message to be sent directly between routers.

Figure 2:
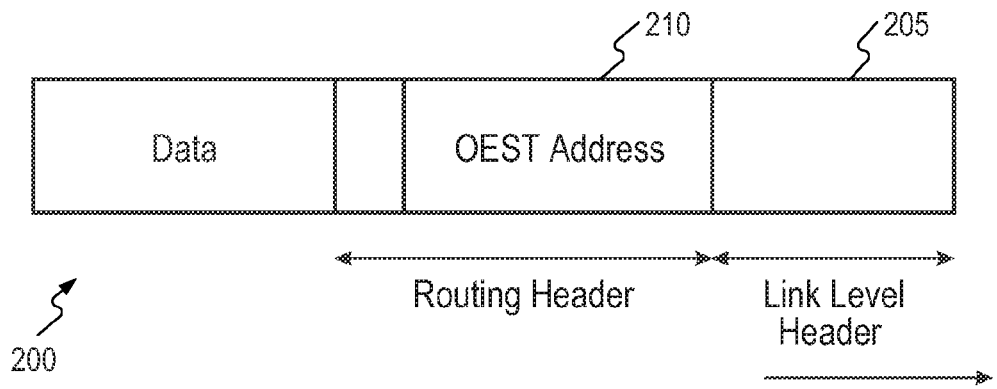
FIG. 2 is a diagram illustrating a message header of a data packet.

A function of data communication network 100 may be to route messages (also referred to as data packets or packets) sent by a source device to a specified destination device. The messages may be routed based on a destination address that may be included in the packets sent by the source device. For example, FIG. 2 shows a format of a message 200 sent by the source device to a destination device. The front of message 200 may contain a link level header 205, followed by a routing header 210. Routing header 210 of message 200 may be examined by the routers for routing purposes. Routing header 210 of message 200 may contain a destination address of the intended recipient, e.g. the destination device. The destination address may typically be encoded as a binary number. In addition to the destination address, routing header 210 of message 200 may also include other fields such as a visit count. The other fields in the destination address may not be fixed, and may vary based on intended routing protocols for message 200.

The destination address of the packets in data communication network 100 may be encoded in binary system and may be provided as a bit string. An example of a bit string may be "0101". A length of the bit string may be defined as a number of bits in the bit string. As an example, the length of the bit string "0101" may be defined as 4.

The destination address of the packets in data communication network 100 may be provided, for example, in two types, IPv4 and IPv6. IPv4, also referred to as version 4 for Internet Protocol (IP), uses addresses that are bit strings of length 32. IPv4 address are provided in dot-decimal notations, which may comprise four decimal numbers, each ranging from 0 to 255, separated by dots, e.g. 172.16. 254.1. Each part of the IPv4 represents a group of 8 bits (octet) of the address, thus providing $2^{32}$ or 4,294,967,296 addresses. IPv6, also referred to as a next generation Internet (or version 6 for IP), uses 128 bits of addresses or 16 octets, thereby providing $2^{128}$ or $3.403 \times 10^{38}$ unique addresses. An example of an address in IPv6 may be 2001:db8:0:1234:0: 567:8:1.

As shown in FIG. 1, the messages in data communication network 100 may be routed towards the destination device by the routers. Routers may route the messages by looking up the message destination address in a forwarding table (e.g. a forwarding database). By performing a lookup operation, the routers may determine an output link for the message and then forward the message to the corresponding output link. The forwarding table may reside in a memory of the router and may list each possible destination and a corresponding link to the each possible destination. Generally, each router may have links to thousands of possible destination and the forwarding table may be required to have the corresponding link to each of these thousands of these destinations.

In order to reduce the size of forwarding tables, the forwarding table may consist of entries corresponding to prefixes. The forwarding table may be populated with entries corresponding to either one of a prefix, a marker, or a prefix-cum-marker, as is explained in greater detail below. A prefix represents a group of destinations whose address all being with that prefix. For example, as shown in FIG. 1, Routers 2, 3, and 4 and the destinations they serve are described by Prefix 1*. Prefixes may be nested within other prefixes. As shown in FIG. 1, Routers 3 and 4 may reach the prefix 100*, which is contained in the group covered by prefix 1*.

The forwarding table may have to store the corresponding output link to reach every prefix that a router is connected to in network 100. The routers receive periodic routing updates from other routers in network 100. The periodic updates may include addition or deletion of routers (or destination addresses) in network 100. These periodic routing updates may be received over various routing update protocols. For example, Router 1 of FIG. 1, may contain an entry that says that Prefix 1* is reachable through Link 2, and Prefix 100* is reachable through Link 6. As an example, to forward a message, with destination address, for example, 100100, the router may perform a lookup in its forwarding table for any prefixes that match the destination address in the message. If more than one prefix match, the router may pick the prefix that has the longest match. For example, in forwarding a message to 100100, this address matches both 100* and 1*, however, 100* is the more specific match, and so the message may be sent to Link 6.

Figure 3:
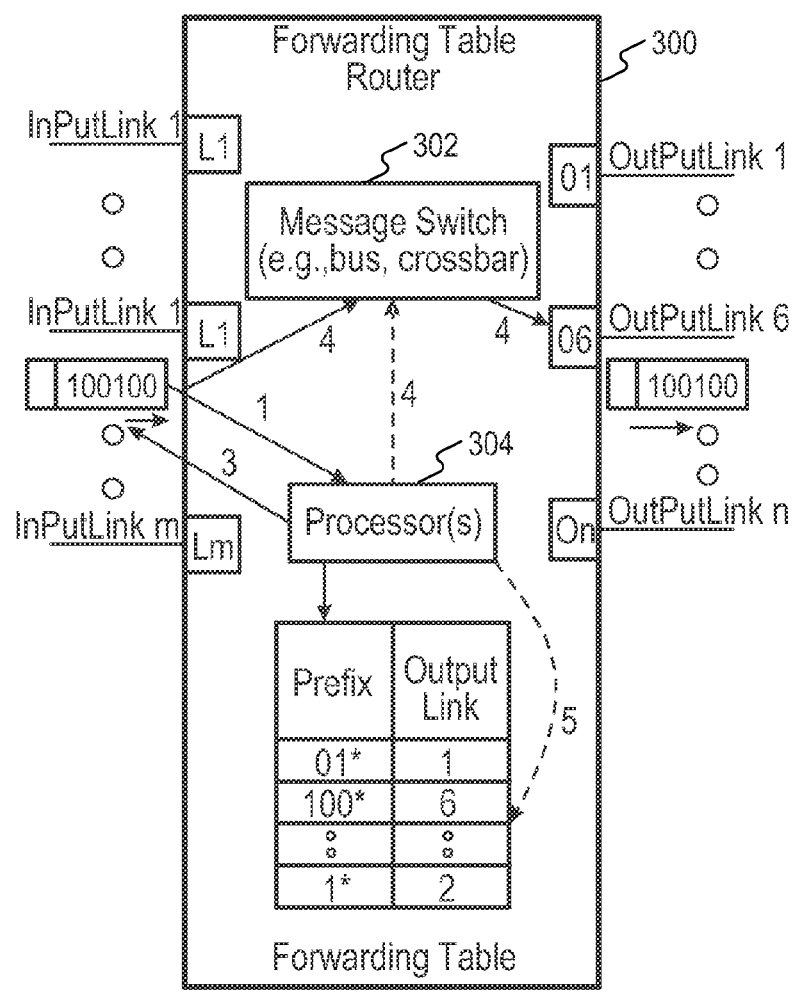
FIG. 3 is a diagram illustrating a router.

FIG. 3 is a diagram illustrating a router 300 of data communication network 100. Router 1, router 2, router 3, router 4, and/or router 5 may comprise the structure of router 300. Router 300 may include input links 1 through m, and corresponding output links 1 through n. Generally, router 300 may have the same number of input and output links. Corresponding to each input link there may be a link interface (L1 through Lm) and corresponding to each output link there may be a link interface (O1 through On). Each link interface may include circuitry to send and receive messages on a particular link, and (possibly) buffers to store messages temporarily before they are forwarded.

As illustrated in FIG. 3, router 300 may include a message switch subsystem 302 and a processing subsystem 304. Processing subsystem 304 may be a single processor, group of processors, a processor per link, or various hardware state machines. Message switch subsystem 302 may be responsible for switching a message from an input link interface to an output link interface under command from processing subsystem 304. Message switch subsystem 302 may contain one or more computer busses, a crossbar switch, or more sophisticated switching systems. In some routers, message switch subsystem 302's function may be performed by one of the processors in processing subsystem 304. In some other routers message switching subsystem 302's functions may be performed by an independent hardware.

Consistent with the embodiments of the disclosure, router 300 may forward a message using the following process. When a message arrives at an input link of router 300, the message may be stored in a corresponding link interface. A processor in processing subsystem 304 may read a destination address (state 1) from the message, and then may perform an address lookup (state 2). The result of the address lookup may specify an output link corresponding to the longest prefix match. Some fields in the message may then (state 3) be updated (e.g., often a visit count is incremented and the link headers are sometimes updated). Finally the message may be switched (state 4) to a specified output link. The switching of the message may be performed by the processor specifying the details of the message, input and output links to message switch subsystem 302 (shown by dotted arrow labeled 4). Message switch subsystem 302 then may transfer the message (shown by solid arrows labeled 4). For example, a message sent to destination address 100100 in FIG. 3 may be matched to prefix 100* and may be switched to output Link 6.

Consistent with the embodiments of the disclosure, and returning to FIG. 1, a message from the source device to the destination device may be sent by having each router in the path do a similar algorithm in data communication network 100. Moreover, one or more additional functions may be performed by router 300 of FIG. 3. As an example, router 300 may periodically receive routing updates from other routers s in network 100. In response to the receipt of the new routing updates, router 300 may rebuild the forwarding table to add or delete some prefixes (state 5). Router 300 may use various algorithms to perform the address lookup to find the longest prefix match.

An example algorithm to perform the address lookup may include scanning the entire forwarding table looking for the best matching prefix of the address. Scanning the entire forwarding table may be grossly inefficient for routers with large tables. Another example algorithm may include converting the best matching prefix problem into an exact match problem. In this algorithm the forwarding table may be divided into several separate forwarding table such that Table i contains all prefixes of length i. The algorithm may then start trying to find the longest prefix possible starting with the longest length prefix table and work backwards until a prefix table that it gets a match on is found. The algorithm based on scanning prefix tables may cost up to 32 exact matches for IPv4 and 128 exact matches for IPv6.

Figures 4A, 4B:
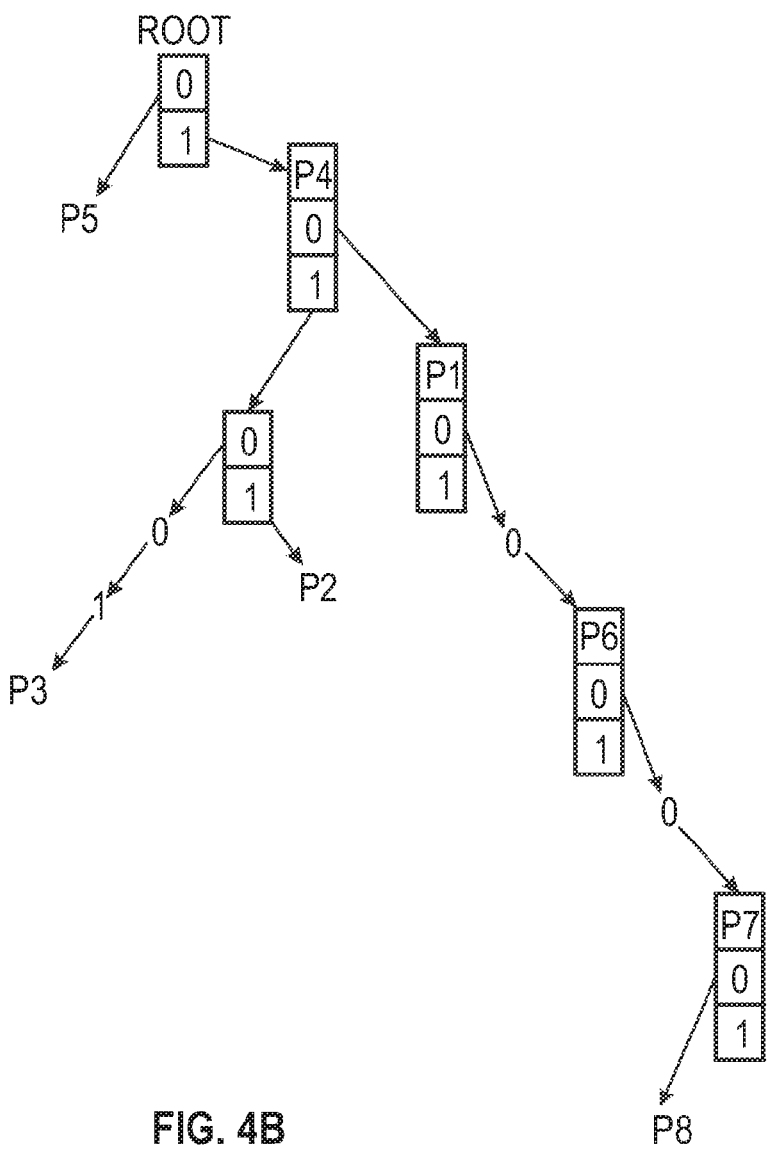
FIG. 4A is a table of sample forwarding address prefixes.
FIG. 4B is an illustration of a sample of forwarding address prefixes organized into a trie architecture.

Yet another example to perform the address lookup may include forming a bit map data tree and traversing through the data tree. An example of a simple bit map data tree may include a trie. A trie may be a data structure that may allow a search for prefixes a bit at a time and to do so incrementally. A trie may be a tree of nodes, each node containing a table of pointers. The standard solutions for IPv4 (e.g., the solution used in BSD UNIX) may use binary tries, in which each trie node may be a table consisting of two pointers. FIG. 4A illustrates a table of sample forwarding prefixes.

FIG. 4B is an illustration of the information contained in FIG. 4A reorganized into a trie structure. Each trie node in the trie structure may be a table or an array, whose topmost entry may include a prefix. Each table may also include two pointers, each of which may point to other trie nodes or to prefixes. As shown in FIG. 4B, the root node (topmost node) may include two pointers. The first pointer, corresponding to the value '0', may point to a sub-trie that contains all prefixes that may start with '0'. Since there is only one such prefix, i.e., P5, the '0' pointer may point directly to P5. On the other hand, other remaining prefixes may begin with '1'. Thus the '1' pointer in the root node, may point to a sub-trie that contains the remaining prefixes.

Consistent with embodiments of the disclosure, each sub-trie in the trie structure may be a smaller trie with a smaller number of prefixes. In addition to pointers, each node in the trie may also include a stored prefix P. The prefixes P may define the path of a trie node N to be the sequence of bits corresponding to the pointers used to reach N starting from the root. Thus in FIG. 4B, the path of the trie node containing P4 is 1 and the path of the trie node containing P1 is 10. The prefix P may be stored inside node N if the path of node N is equal to prefix P, ignoring the * character. Thus and as illustrated in FIG. 4B, the node that stores P1 (which is equal to 10*) is indeed 10.

Consistent with embodiments of the disclosure, if there is at most one pointer at a node and there are no prefixes stored, then a general trie node may be collapsed into a simpler primitive node that only contains a bit and a pointer. For example, the path to prefix P3=11001 (stored at bottom left of FIG. 4B) may start at the root node and follows the 1 pointer (first bit of P3); then may go to the node containing P4 and may follow the 1 pointer (second bit of P3); at the next node the path may follow the 0 pointer (third bit of P3). After the traversing there are no other prefixes that share the same path with P3 and thus we have 2 primitive nodes corresponding to the fourth and fifth bits of P3 (0 and 1 respectively) which finally lead to P3. Thus the bits in a prefix may be used to trace a path through the trie that leads to the prefix by itself (e.g., P3) or to a node that stores the prefix (e.g., P4).

To find a best match prefix in the trie, successive bits of the destination address may be used to trace a path through the trie, starting from the root node, until no pointer is found or the algorithm reached at an end at a prefix. As the algorithm traverses through the trie, the algorithm may have to remember the last prefix it traversed at a previous node, if any. When the algorithm fails to find a pointer, the last traversed prefix is returned as the best matching prefix.

The worst case time to walk through a trie path may be the maximum number of nodes in a trie path. In the example of FIG. 4B, the path to P8 requires following 7 pointers. In general, if we have the prefixes 1*, 11*, 111*, 1111*, etc. then we can easily have a trie path equal to the maximum address length (32 for IPv4, 128 for IPv6). Thus the time for trie search of an address may be as bad as following 128 (or 32 for v4) pointers. Moreover, the following of each pointer requires at least one read of memory. Hence following each pointer may slow down the lookup operation and hence the delivery of the packets.

To overcome the drawback of the trie structure, and with the advent of IPv6 that may allow efficient aggregation of subnet routing prefixes to occur at routing nodes, the bit map data tree may be structured to have more than two branches at the nodes. As an example, the bit map data tree may be formed by taking more than one prefixes at a time. As an example, a search node may include two prefixes. A search node having two prefixes may include four branches. Similarly, a search node having three prefixes may include eight branches, and so on.

Consistent with the embodiments of the disclosure, the number of prefixes, also referred to as strides, in the bit map data tree may determine number of for the search node. The number of strides per search node in the bit map data tree however increases a width of the data tree. As an example, if a search node has longer stride, there will be larger number of branches associated with the search node. If there is larger number of branches for a search node many branches may go unused. Especially in IPv6, there will be many unused address spaces and hence many unused branches. Such tree structures with many unused branches are also referred to as sparse trees. On other hand tree structure with less number of branches and less or no unused branches for search nodes, may also be referred to as dense tree.

Each branch of the search node in the bit map data tree may require a dedicated memory or access to the memory. Hence larger number of branches means more memory or frequent memory access for lookup operation. As an example, while traversing through the tree with large number of branches, the router may have to mark a best match so far (e.g. best leaf so far (BLSF)) while traversing through each of the branches. Each marking requires a dedicated memory space to store a BLSF tag.

The longer strides in the data tree, however, may reduce the number of lookups for the destination address or to find the longest prefix for message routing. Hence increasing the number of branches in the data tree may improve performance of the lookup operation without exponentially increasing the memory footprint. Embodiments of the disclosure provide processes to optimize the data tree and hence the lookup operation. The processes disclosed herein may be used to optimize a sparse data tree, a dense tree, and a data tree that is in between sparse and dense. The lookup operation may be optimized by optimizing search nodes and number of branches associated with the search nodes in the data tree. The bit map data tree may be optimized by selectively replacing search nodes with a node called hash nodes. The search nodes to be replaced by the hash nodes may be selected based on one or more user defined criteria (for example number of branches associated with the search node).

As an example, the processes disclosed herein may traverse through sparse trees, such as IPv6, to take a long stride, but have a smaller number of branches. The longer strides and smaller number of branches may allow the processes to traverse through a sparse prefix list very quickly with, and with a smaller memory footprint. The stages of the processes are described in reference with FIG. 5 in the following sections of the disclosure.

Figure 5:
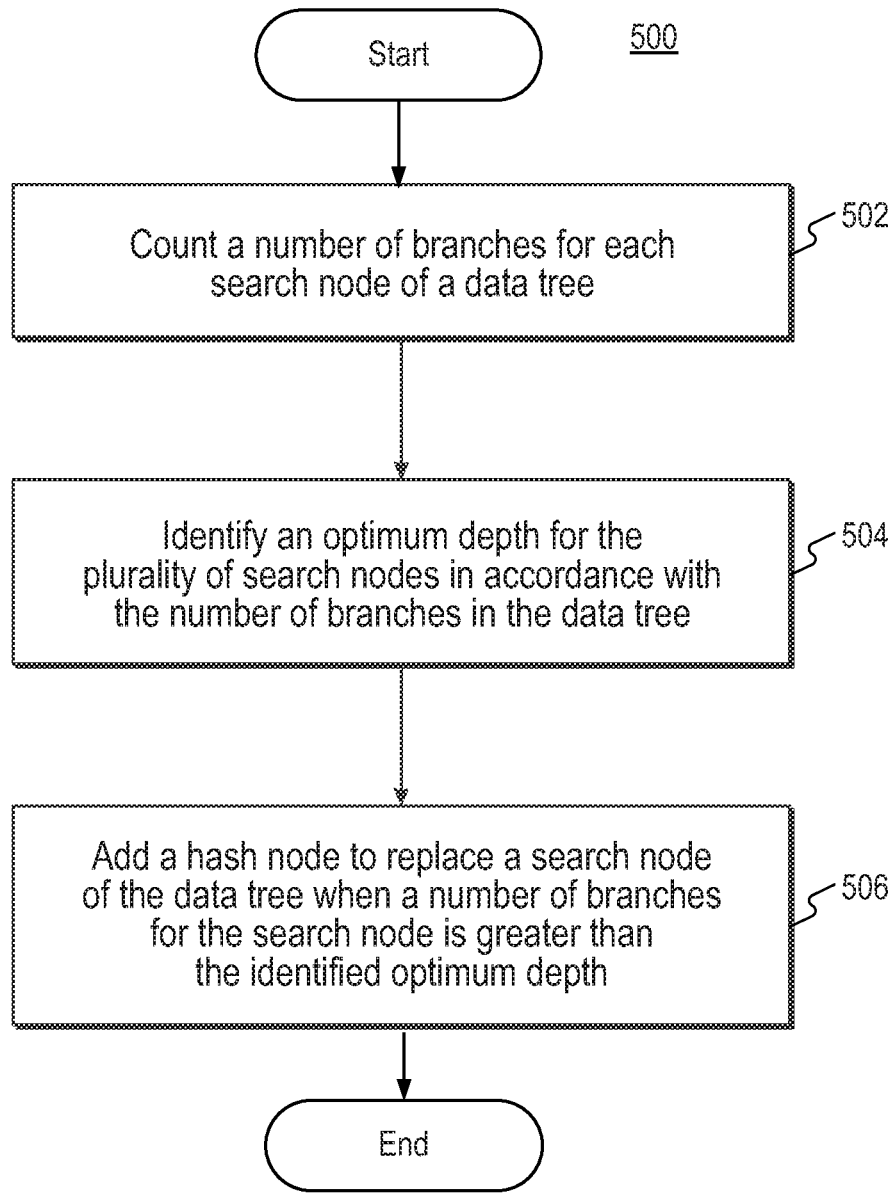
FIG. 5 is a flow diagram for a method for enhancing a bit map data tree for data packet routing.

As illustrated in FIG. 5, a method 500 for optimizing a bit map data tree begins at stage 502 with the counting of a number of branches associated with a plurality of search nodes in a bit map data tree. As an example, while performing a lookup operation, router 300 may determine a number of prefixes associated with each of the plurality of search nodes, hence the number of branches associated with the search nodes.

From stage 502, method 500 advances to stage 504. At stage 504 of FIG. 5, method 500 may identify an optimum depth for the plurality of search nodes in the data tree. The optimal depth may be identified based on the number of branches of the search nodes in the data tree. The optimum depth for the plurality of nodes in the data tree may be identified using a scoring algorithm. The scoring algorithm may traverse up to a certain depth of the data tree, determine how many branches there are, and then evaluate how valuable that was. The scoring algorithm then may go to the next depth and evaluate how valuable that was, etc., and find the optimum depth of the next search node. The optimum depth for the data tree may be determined as certain number of branches within an acceptable range to minimize a number of internal nodes. The scoring algorithm may also maximize perfect nodes and strides for the external nodes for the search node. The scoring algorithm may use weighted criteria to identify the optimum depth. As an example, the scoring algorithm may assign certain weights while traversing the data tree to number of internal nodes, number of perfect nodes and number of external nodes.

Once stage 504 is completed, method 500 advances to stage 506. At stage 506, after identifying the optimum depth, method 500 may selectively add a hash node to replace a search node of the data tree. The search nodes in the data tree may be replaced with hash nodes when a number of branches for the search node is greater than the identified optimum depth. Method 500 may, for the search nodes in the data tree with a number of branches more than the identified optimal depth, hash down the number of branches. By hashing the branches of a search node, the total number of branches associated with the search node may be reduced. As an example, if there are four branches for a search node with prefixes 010, 011, 101, and 111, method 500 may hash those four branches to a single branch in the hash node. As another example, for a search node with three bit prefix, there may be eight branches in the data tree. Method 500 may replace such search node with a hash node with 4 branches. Similarly a search node with 24 bit prefix may be replaced with a hash node having 16 branches. A number of prefixes to be hashed for a search node may be limited by memory uses and collision in hashing algorithms. The details of hash nodes and a hashing algorithm are described in greater detail below.

Consistent with the embodiments of the disclosure, the hash node may replace the bitmap of the search node of the data tree with a set of parameters for the hash function. These set of parameters may be manipulated in order to search for perfect or close to perfect hashes. Because hash lookups may miss, every node may contain a tag along with information indicating whether the result is a miss and to discontinue searching for the tag. The longer the prefix and the more collisions can be avoided, the better the performance. If a number of table entries are kept relatively small, and we are willing to increase the size of the hash table, it will be easier to locate a perfect or optimal hashing algorithm. The following tables may show the search nodes along with the hash nodes consistent with embodiments of the disclosure.

A hash node may have a very large stride and may be able to process a reasonably large number of entries. The hash nodes may be a replacement primarily for the search nodes. Method 500 may sacrifice some memory in order to increase the stride and reduce the number of memory (such as DRAM) accesses, thus speeding up the lookup operation.

TABLE 1

| Name | Stride | Entries | Has BLSF | Description |
|---|---|---|---|---|
| Search Node | 6-12 | 1-4096 | Yes | Bitmap of all possible branches |
| Internal Node | 5 | 1-126 | Yes | Bitmap of all possible branches and prefixes |
| Stop Node | 6-12 | 1-4096 | Yes | Stop Searching and return intermediate results |
| Skip Node | 1-63 | 1 | Yes | Exact match for a section of the key |
| Leaf Node | N/A | N/A | No | User Data to be returned on completion |
| Hash Node | 6-30 | 64-6384 | Yes | Perfect Hash of branches PROPOSED |

Consistent with the embodiments of the disclosure, in addition to the hash node itself, variants of existing commands may be defined that may replace the BLSF field with information necessary to validate the hash entry and to de-refer the BLSF. If a search node's parent is not a hash node, then the definitions for the search node may remain identical to their current definition. This means that in the absence of hash nodes, the structure and semantics of a pointer look-up (PLU) tree is 100% backward compatible. If a search node's parent is a hash node, then the BLSF is replaced with a tag and some bits to validate the entry, along with a bit to indicate the presence of a BLSF.

There are 28 bits used for the BLSF field in the PLU nodes. These 28 bits of the BLSF may be reclaimed and used for the tag to validate the hash table entry. Of these 28 bits, three bits may be used to determine if the tag matches and whether or not to continue searching for a match. These three bits may be created as Valid, Continue, and Stop. Of the remaining 25 bits, 1 bit may be used to indicate presence of a BLSF. The tag may occupy the remaining 24 bits. Hence hash stride for a hash node may be at most 24. However, with the stipulation that the Child Array (CA) field may also be applied in the hash node, thereby increasing a maximum stride to 30 bits. Table 2 and Table 3 below illustrate example bit allocation for the hash nodes.

TABLE 2

| | 3 3 2 2 2 2 2 2 2 2 2 2 1 1 1 1 1 1 1 1 1 1 | | | | | | | |
|---|---|---|---|---|---|---|---|---|
| | 1 0 9 8 7 6 5 4 3 2 1 0 9 8 7 6 5 4 3 2 1 0 9 8 | 7 | 6 | 5 | 4 | 3 | 2 1 0 | |
| 0 | Leaf Array Pointer [31:4] | | | | | | Type | |
| 1 | Tag [23:0] | S | C | V | B | T | I | CA |
| 2 | Node Specific Data [63:32] | | | | | | | |
| 3 | Node Specific Data [31:0] | | | | | | | |

TABLE 3

| Field Name | Width | Notes |
|---|---|---|
| Tag | 24 | The tag that must match in order to hit. |
| Valid (V) | 1 | Entry has a valid tag |
| Continue (C) | 1 | There is more than one tag that hashes to this entry, if the tag does not match continue searching the next location in the table. |
| Stop (S) | 1 | There are no more tags that could possibly match. |
| BLSF Present (B) | 1 | The BLSF is the Next Node Address |
| BLSF Twin Leaf (T) | 1 | If 0, then the leaf pointed at by BLSF Pointer is a 16-byte leaf, and the IE bit in the PLU search command is ignored. If 1, then the leaf is a 32-byte leaf, with 16 bytes for ingress and 16 bytes for egress. The PLU resource uses the IE bit in the search command to select the 16-byte half to return. |
| Internal Nodes exists (I) | 1 | Indicates if the Next Node Address field contains either a pointer to the next internal node (I = 1) or is the Child Array pointer of a Super Node (I = 0). |
| Child Array (CA) | 2 | Child Array cluster size - determines the stride length of this node.<br>00: stride length is +0<br>01: stride length is +2<br>10: stride length is +4<br>11: stride length is +6 |

Consistent with the embodiments of the present disclosure, and as illustrated in Table 3 above, the BLSF present bit, may indicate that the BLSF is the first entry of the array pointed to by a next node address (or first two entries if the BLSF Twin (T) bit is set), and that subsequent entries come after the BLSF.

Consistent with the embodiments of the present disclosure, the hash algorithm used for the hash nodes may be a two tiered algorithm. The first level hash, of the two tiered algorithm, may assign keys to buckets. There may be up to 16 buckets. A second level hash may assign entries for each key within that bucket. There may be 8 possible second level factors for performing the hash function, and each bucket may use 1 out of this possible 8 second level factors. A compiler may select the best second level factor for each bucket in turn. The second level factor for each bucket may be different for every bucket. Choosing a different second level factor may maximize a probability of being able to find a perfect hash so that there are no collisions. The hash table entry has (N buckets)*(M entries/bucket) entries that is indexed by the concatenation of the two hashes. Tables 4 and 5 illustrates example structures of the buckets of the two tiered hashing algorithm.

TABLE 5

| Field Name | Width | Notes |
|---|---|---|
| Type | 4 | 1001 = Hash Node (was Unused Node) |
| Stride | 5 | The number of tag bits (valid range is from 6 to 24). |
| BLSF Twin Leaf (T) | 1 | If 0, then the leaf pointed at by BLSF Pointer is a 16-byte leaf, and the IE bit in the PLU search command is ignored. If 1, then the leaf is a 32-byte leaf, with 16 bytes for ingress and 16 bytes for egress. The PLU resource uses the IE bit in the search command to select the 16-byte half to return. |
| Internal Nodes exists (I) | 1 | Indicates if the Next Node Address field contains either a pointer to the next internal node (I = 1) or is the Child Array pointer of a Super Node (I = 0). |
| Child Array (CA) | 2 | Child Array cluster size - determines the stride length of this node.<br>00: stride length is +0<br>01: stride length is +2<br>10: stride length is +4<br>11: stride length is +6 |
| N Buckets | 3 | The binary exponent number of buckets produced by the first level hash. Valid Entries:<br>0) 1 bucket<br>1) 2 buckets<br>2) 4 buckets<br>3) 8 buckets<br>4) 16 buckets |
| BH[Bucket] | 3 | The Hash Factor (1 out of 8) to use for the second level hash of that bucket. |
| Top Hash | 5 | Selects 1 out of 32 Hash Factors for the first level hash |
| Bucket Size | 3 | The binary exponent number of entries in each bucket produced by the second level hash. Valid Entries:<br>0) 1 entry<br>1) 2 entries<br>2) 4 entries<br>3) 8 entries<br>4) 16 entries<br>5) 32 entries<br>6) 64 entries<br>7) 128 entries |

As illustrated in Table 4 and Table 5, the hash factors may be stored in tables and may be 24 bits in length. In an example embodiment, there may be a 32 entry table for the first level (or top) hash factors, and an 8 entry table for the second level (or bucket) hash factors.

Consistent with the embodiments of the disclosure, the hashing algorithm may perform a universal hash function using factors. Both the key and the factor may be split into an array of N bit fields, N being the size of the resultant hash, forming the array K[ ] and F[ ] of dimension ceiling (SIZE$_{key}$/N). Each pair of K and F may be multiplied together, and then added to an accumulator, throwing away

TABLE 4

| | 3 1 | 3 0 | 2 9 | 2 8 | 2 7 | 2 6 | 2 5 | 2 4 | 2 3 | 2 2 | 2 1 | 2 0 | 1 9 | 1 8 | 1 7 | 1 6 | 1 5 | 1 4 | 1 3 | 1 2 | 1 1 | 1 0 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| 0 | Leaf Array Pointer [31:4] ||||||||||||||||||||||||||||| Type ||||
| 1 | BLSF or Tag |||||||||||||||||||||||||||| T | I | CA ||
| 2 | Stride ||||| N Buckets |||| BH[15] ||| BH[14] ||| BH[13] ||| BH[12] ||| BH[11] ||| BH[10] ||| BH[9] ||| BH[8] |||
| 3 | Top Hash ||||| Bucket Size |||| BH[7] ||| BH[6] ||| BH[5] ||| BH[4] ||| BH[3] ||| BH[2] ||| BH[1] ||| BH[0] ||| any bits over N. A mathematical equation for the hash function may be represented as:

$$\text{Hash} = \sum_{i=0}^{Ceiling\left(\frac{SIZE_{key}}{N}\right)} (K[i] * F[i]) \bmod 2^N$$

To find the index for the entry, the first and second level hashes may be concatenated together. A mathematical model for the index may be represented as:

Index={Hash$_{SECOND}$(Key),Hash$_{FIRST}$(Key)}

Consistent with the embodiments of the disclosure, in the absence of hash nodes, the PLU may have the exact same functionality with the existing search nodes. The BLSF field may become a tag field when a search node is accessed from a hash node. The PLU may have to remember whether the parent node was or was not a Hash Node. When the PLU comes across a hash node it performs following operations:

a) Determine the hash parameters and retrieve the location indicated. The hash parameters and location determination may be a combination of the hash, a next node address, a child array, and the BLSF. If there is a BLSF then the first entry at the next node pointer is the BLSF (first two entries if the BLSF Twin bit is set). The hash table may immediately follow the BLSF entries (or starts at the Next Node Pointer if there is no BLSF).

b) Examine the tag and if the tag matches process the node. If the tag does not match and the Continue bit is set retrieve the next location and repeat. If the continue bit is not set return the BLSF.

c) Keep searching until either the tag is found or the stop bit is set.

d) If the tag search misses return the BLSF.

Consistent with the embodiments of the present disclosure, and in general, the hash tables may be kept relatively small. The size of the hash table may have an impact on compilation time. As an example, discovering an optimal hashing algorithm may be an expensive process and may increase exponentially with the number of entries in the hash tables. If the tables are large then there may be an expense of initializing every entry in the table. The optimal tradeoff between stride and update rate may be dependent on a control plane of an implementation. However, some testing of the algorithm shows that finding a perfect hash for the bucket within 8 tries is attainable over 99.98% of the time when 4 keys are stored in 16 entries.

Consistent with the embodiments of the present disclosure, the enhancements proposed in the disclosure may not break the current usage model for data packet routing. The PLU may always return 127 bits of user data. The methods and systems described herein may not allow hash nodes to point directly to leaf nodes. The hash nodes may not point directly to the leaf nodes as the leaf nodes may not have space for a tag. If an amount of data returned by a leaf node is reduced from 127 bits to 96 bits, then tags may be provided in leaf nodes and the leaf nodes may then be pointed directly from the hash nodes. The hash node may be very similar to existing search nodes, except that instead of containing 64 bits of bitmap, it may contain 64 bits of hash parameters.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
counting a number of branches for each search node of a data tree, the data tree comprising a plurality of search nodes;
identifying an optimum depth for the plurality of search nodes based on the number of branches in the data tree; and
replacing a search node of the data tree with a hash node, when a number of branches for the search node is greater than the identified optimum depth, the hash node comprising buckets having entries of hashed branches of the search node, wherein replacing the search node with the hash node comprises:
hashing branches of the search node using a first hash function,
classifying the hashed branches into the buckets, each of the buckets having at least one branch; and
hashing the at least one branch assigned to the buckets using a second hash function to assign an individual location in respective buckets, wherein the second hash function is different from the first hash function.

2. The method of claim 1, wherein identifying the optimum depth for the plurality of search nodes in the data tree comprises identifying the optimum depth for the plurality of search nodes in the data tree based on a scoring algorithm.

3. The method of claim 1, wherein identifying the optimum depth for the plurality of search nodes in the data tree comprises identifying the optimum depth based on weights assigned to internal nodes, external nodes, and leaves associated with each of the plurality of search nodes.

4. The method of claim 1, wherein identifying the optimum depth for the each of the plurality of search nodes in the data tree comprises identifying the optimum depth for the each of the plurality of search nodes in the data tree, wherein the optimum depth is identified as a range of number of branches.

5. The method of claim 1, wherein replacing the hash node to replace the search node of the data tree further comprises replacing a bit map of the search node with a set of parameters for the first hash function.

6. The method of claim 5, wherein replacing the bit map of the search node with the set of parameters for the first hash function comprises replacing the bit map of the search node with the set of parameters for the first hash function, wherein the set of parameters are manipulated to search for a close to perfect hash.

7. A method comprising:
constructing a bit map data tree comprising a plurality of search nodes;
identifying an optimum depth for each of the plurality of search nodes based on a number of branches in the data tree; and
replacing a search node of the data tree with a hash node when the number of branches for the replaced search node is greater than the identified optimum depth, the hash node comprising at least one bucket having entries of hashed branches of the search node, wherein replacing the search node with the hash node comprises:
hashing branches of the search node using a first hash function,
classifying the hashed branches into the at least one bucket, each of the at least one bucket having at least one branch; and
hashing the at least one branch assigned to the eat least one bucket using a second hash function to assign an individual location in respective bucket, wherein the second hash function is different from the first hash function.

8. The method of claim 7, wherein replacing the search node in the data tree comprises adding the hash node to replace the search node using a two stage hashing process.

9. The method of claim 1, wherein hashing the plurality of branches to classify the plurality of branches into the at least one bucket using the first hashing algorithm comprises hashing the plurality of branches to classify the plurality of branches into at least one of: 1 bucket, 2 buckets, 4 buckets, 8 buckets, and 16 buckets.

10. The method of claim 1, wherein hashing the plurality of branches to classify the plurality of branches into the plurality of buckets using the first hashing algorithm comprises hashing at least one of the following number of branches in the least one bucket: 1 branch, 2 branches, 4 branches, 8 branches, 16 branches, 32 branches, 64 branches, and 128 branches.

11. An apparatus comprising:
a plurality of input ports that receive a message having a destination address;
a plurality of output ports that output the message based on a return route pointer; and
a routing table circuit configured to receive the message having the destination address, the routing table circuit further comprising:
at least one memory to store at least one bit map data tree, wherein the bit map data tree comprises a plurality of search nodes, wherein the routing table circuit is configured to replace at least one of the plurality of search nodes in the data tree with at least one hash node, wherein the at least one of the plurality of search nodes is replaced with the hash nodes based on a comparison with an optimal depth for the plurality of search nodes, the optimal depth determined in accordance with a number of branches associated with the plurality of search nodes, and wherein the hash node comprises at least one bucket comprising entries corresponding to hashed branches of the at least one of the plurality of search nodes, wherein the routing table circuit is further configured to:
hash branches of the search node using a first hash function,
classify the hashed branches into the at least one bucket, each of the at least one bucket having at least one branch; and
hash the at least one branch assigned to the eat least one bucket using a second hash function to assign an individual location in respective bucket, wherein the second hash function is different from the first hash function.

12. The apparatus of claim 11, wherein the routing table circuit is further configured to perform a lookup operation on the data tree.

13. The apparatus of claim 11, wherein the routing table circuit being configured to replace the at least one of the plurality of search nodes with the hash nodes further comprises the routing table circuit being configured to reclaim a best leaf so far (BLSF) field from the search node to be used for a tag to validate a hash table entry.

14. The apparatus of claim 13, wherein the routing table circuit being configured to reclaim the BLSF field from the search node further comprises the routing table circuit being configured to use at least three bits from the BLSF field to determine if the tag matches and whether to continue searching for a match.

15. The apparatus of claim 14, wherein the at least three bits respectively correspond to a valid bit, a continue bit, and a stop bit.

16. The apparatus of claim 15, wherein the BLSF field is 28 bits long and wherein 1 bit is used to indicate a presence of a BLSF.

17. The apparatus of claim 16, wherein 24 bits are used for the tag.

* * * * *